United States Patent [19]

Thurston et al.

[11] Patent Number: 4,949,755

[45] Date of Patent: Aug. 21, 1990

[54] FLUIDIC VOLUMETRIC FLUID FLOW METER

[75] Inventors: John F. Thurston; Alan L. Golembiewski, both of Mesa

[73] Assignee: Allied-Signal Inc., Morris Township, Morris County, N.J.

[21] Appl. No.: 460,499

[22] Filed: Jan. 3, 1990

Related U.S. Application Data

[62] Division of Ser. No. 933,648, Nov. 21, 1986.

[51] Int. Cl.$^5$ .............................................. F15C 5/00
[52] U.S. Cl. ..................................... 137/833; 137/826
[58] Field of Search ............... 137/833, 835, 826, 804, 137/803, 805

[56] References Cited

U.S. PATENT DOCUMENTS

| | | | |
|---|---|---|---|
| 3,015,233 | 1/1962 | Ryder et al | 73/861.59 |
| 3,240,061 | 1/1966 | Bloom et al. | 73/861.59 |
| 3,338,097 | 8/1967 | Bloom et al. | 73/861.59 |
| 3,371,530 | 3/1968 | Howe | 73/861.59 |
| 3,430,489 | 3/1969 | Pfrehm | 73/861.03 |
| 3,495,604 | 2/1970 | Trask, II | 137/833 |
| 3,528,445 | 9/1970 | Shinn et al. | 137/833 |
| 3,534,757 | 10/1970 | Doherty | 137/833 |
| 3,635,084 | 1/1972 | Lamphers et al. | 73/861.03 |
| 3,690,171 | 9/1972 | Tippetts et al. | 73/861.19 |
| 3,699,812 | 10/1972 | Masnik | 73/861.59 |
| 3,811,474 | 5/1974 | Bauer et al. | 137/833 |
| 3,889,534 | 6/1975 | Grant | 73/861.19 |
| 3,942,558 | 3/1976 | Honda et al. | 137/833 |
| 4,050,304 | 9/1977 | Thomas | 73/861.19 |
| 4,107,990 | 8/1978 | Ringwall | 73/861.19 |
| 4,154,115 | 5/1979 | Hartung et al. | 73/718 |
| 4,244,212 | 1/1981 | Stignani | 73/115 |
| 4,404,859 | 9/1983 | Ohsawa et al. | 73/861.1 B |
| 4,467,984 | 8/1984 | Tippetts | 137/833 |
| 4,584,883 | 4/1986 | Miyoshi et al. | 73/861.24 |
| 4,610,162 | 9/1986 | Okabayashi et al. | 73/861.19 |
| 4,716,936 | 1/1988 | Mon et al. | 137/833 |

FOREIGN PATENT DOCUMENTS

1400831  7/1975  United Kingdom .

Primary Examiner—A. Michael Chambers
Attorney, Agent, or Firm—Terry L. Miller; James W. McFarland; Robert A. Walsh

[57] ABSTRACT

Fluidic volumetric flow meter method and apparatus wherein undesirable dynamic interaction (ringing) which could appear in an output signal is inhibited. Electrical isolation and shielding also contribute to a high quality output signal in accordance with the invention. Particularly advantageous housing structures adapt the flow measurement device to a variety of applications as a complete flow meter.

2 Claims, 6 Drawing Sheets

FLUIDIC VOLUMETRIC FLUID FLOW METER

This is a division of application Ser. No. 06/933,648 filed Nov. 21, 1986.

BACKGROUND OF THE INVENTION

Field of the invention is apparatus and methods for measurement of volumetric flow rate of flowing fluid. More particularly, the invention relates to dynamic or inferential measurement devices, as opposed to positive displacement measuring devices, which former devices are additionally of fluidic operation.

Conventional fluidic measuring devices in the field to which the present invention relates are disclosed in the following United States Patents:

| U.S. Pat. No. | ISSUED | INVENTOR(S) |
| --- | --- | --- |
| 3,690,171 | 12 September 1972 | Tippetts, et al |
| 3,889,534 | 17 June 1975 | J. Grant |
| 4,050,304 | 27 September 1977 | A. Thomas |
| 4,107,990 | 22 August 1978 | C. Ringwall |
| 4,404,859 | 20 September 1983 | Ohsawa, et al |

These teachings establish that the possibility of measuring fluid flow rate, either on a volume or mass basis, has been recognized for a number of years. The first three teachings listed above are believed to apply wall-attachment type fluidic oscillators to, respectively, measurement of volumetric flow rate as a function of oscillator frequency, to measurement of mass flow rate as a function of oscillator amplitude and frequency, and to measurement of mass flow rate as a function of oscillator frequency and total pressure drop across the oscillator.

The Ringwall patent (4,107,990) recognizes the deficiencies of wall-attachment fluidic oscillators in the application to flow rate measurement. Accordingly, the Ringwall patent teaches use of a differential pressure proportional fluidic oscillator to provide a volumetric flow rate meter. However, to extend the measurement range of the Ringwall teaching beyond that obtainable with a single oscillator, multiple amplifier stages must be utilized. Additionally, it is believed that the signal quality which is obtained from an oscillator as taught by Ringwall may be less than optimum. This output signal is believed to be contaminated with dynamic oscillation, or ringing, noise which is internally self-generated by the oscillator as a result of internal fluid inductances and capacitances.

An alternative approach to fluid mass flow rate measurement is presented by U.S. Pat. No. 4,508,127 issued 2 Apr. 1985 to a coinventor of the present invention and assigned in common therewith. The disclosure of the '127 patent is specifically incorporated herein by reference to the extent necessary for a complete disclosure and understanding of the present invention. The '127 patent teaches use of a dynamic volumetric flow rate meter, such as a turbine meter, to obtain a signal indicative of volumetric fluid flow rate. A fluidic oscillator having a regulated total pressure drop thereacross is employed to generate a second signal indicative of fluid density. The two signals are combined by multiplication to obtain an indication of fluid mass flow rate.

However, it is desirable to provide a volumetric fluid flow rate meter which avoids the use of moving-part type flow meters. The fluidic oscillator because of its rugged, no-moving-parts construction is recognized as offering considerably improved service life over all flow meters having moving parts, such as the turbine flow meter, for example. Further, the limited flow measurement range and need for multiple oscillators of the Ringwall teaching should be avoided. Finally, it is highly desirable to provide such a volumetric flow rate meter with a "clean" output signal substantially free of both self-generated noise or ringing, and noise of electrical origin.

SUMMARY OF THE INVENTION

The inventors have discovered that internally self-generated noise in a fluidic oscillator may result from dynamic interaction between moving fluid in the feedback channels of the oscillator and the output signal generating apparatus. In other words, the feedback channels provide a fluid inductance, and the output transducers a fluid capacitance with under the influence of the plusating, time-variant oscillations of the oscillator itself set up an internal self-generated noise or ringing. This ringing noise appears in the output signal of the flow meter and degrades the performance or measurement accuracy thereof.

Accordingly, the invention provides a fluidic device having an inlet and a flow path extending from the inlet to the outlet. A part of the flow path defines a power jet nozzle upstream of and leading to an interaction chamber. The interaction chamber leads to the outlet. A splitter is spaced from the power nozzle across the interaction chamber and is in alignment therewith to separate a pair of feedback inlets leading from the interaction chamber. a pair of feedback channels extend from the pair of feedback inlets to respective feedback outlets. The feedback outlets are oppositely disposed perpendicularly to the power nozzle and intermediate the latter and the interaction chamber. A branch passage extends from each feedback channel to a respective variable-volume chamber which is bonded by a flexible diaphragm. The diaphragms are movable in response to pressure variations within the respective variable-volume chamber and are associated with means for producing an output signal in response to such movement. Fluid flow restriction means are provided in each branch passage for resisting dynamic oscillation (ringing) of fluid flow in the feedback channels with the variable volume of fluid in the variable-volume chambers.

In a further aspect of the invention, second fluid flow restriction means are provided in each of the feedback channels between the branch passage and the feedback outlet of each. These second fluid flow restriction means have the effect of increasing the magnitude of the pressue fluctuations in the variable-volume chambers and thereby of increasing the magnitude of the output signal produced, notwithstanding the first fluid flow restrictions.

According to still anoter aspect of the invention, a vent passage is provided opening outwardly of each variable-volume chamber to communicate with the outlet, and third fluid flow restriction means is provided in each vent passage.

Yet another aspect of the invention provides fluid flow bypass means in fluid flow parallel with the first-described fluidic device. The bypass means provides a plurality of fluid flow parallel flow paths. Each of the flow paths of the bypass means replicates the power nozzle of the first-described fluidic device so that the same characteristic of coefficient of discharge is provided by the parallel plural flow paths.

Additional aspects of the invention provide housing structure for receiving both the first-described fluidic device and a second-described bypass means, the two cooperatively defining a fluid volume flow rate module. The housing also provides for communication outwardly thereof of the output signal of the device. In one particularly described and depiced embodiment of the invention, redundant volume flow rate measurement modules are provided in a uniquely arranged structure which is particularly advantageous in the aerospace technologies.

Still additionally, the invention provides a fluid volumetric flow meter wherein an output transducer includes an electrically conductive diaphragm bonded electrically with a piezoceramic disc. Both the diaphragm and the disc are electrically isolated from surrounding structure. Upon flexure of the diaphragm an electrical signal is produced across the piezoceramic and is conducted to a point of utilization in part by the diaphragm, but not by surrounding structure. Surrounding structure may effectively shield the output transducer from electrical interference.

Additional objects and advantages of the present invention will appear from reading the following detailed description of several preferred embodiments of the invention taken in conjunction with the accompanying drawing figures. The following detailed description includes description of embodiments of the invention which may be employed as principal components of a liquid fuel volume flow rate sensor, a part of an electronic fuel controller for a turbine engine. However, the invention is not limited to such use and is not intended to be so limited. In fact, in many respects the invention has almost universal application to the art of flow measurement. This broad scope of the present invention will quickly appear to those skilled in the art of flow measurement in view of the following.

DETAILED DESCRIPTION OF THE PREFERRED EMBODIMENTS OF THE INVENTION

Figure 1:
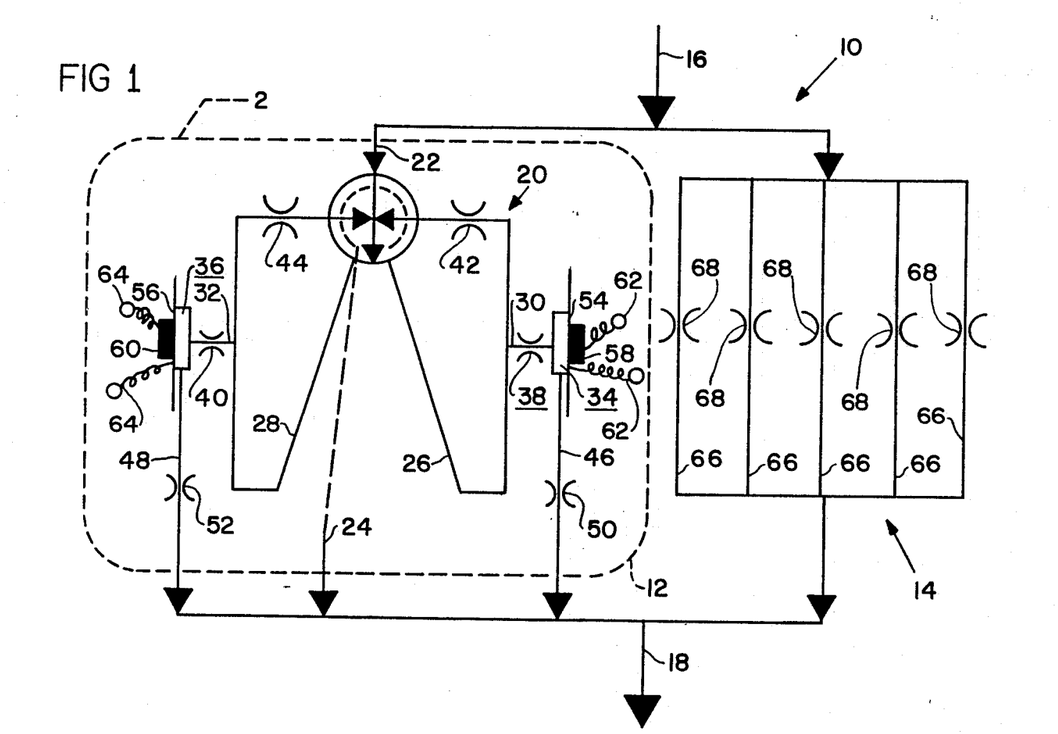
FIG. 1 schematically depicts a liquid volumetric flow rate meter embodying the invention.

FIG. 1 depicts schematically a fluidic liquid volumetric flow meter, which is generally referenced with the numeral 10. Flow meter 10 includes a flow sensing device 12 and a bypass unit 14. An inlet 16 to the flow meter communicates both with the flow sensing device 12 and with the bypass unit 14, while an outlet 18 from the flow meter similarly communicates with both 12 and 14. The flow sensing device 12 includes a fluidic oscillator 20 having an inlet 22 and outlet 24 and feedback channels 26,28. Connected with the feedback channels 26,28 via branch passages 30 and 32 are a pair of variable-volume sensing chambers 34,36. Each of the branch passages 30,32 includes a fluid flow restriction 38,40, respectively. Similarly, each of the feedback passages 26,28 includes a fluid flow restriction 42,44. Extending from each of the variable volume sensing chambers 36,38 is one of a pair of vent passages 46,48, each having its respective fluid flow restriction 50 and 52. Each of the variable-volume chambers 34 and 36 is bonded by a flexible and electrically conductive diaphragm 54 and 56, respectively, upon which is mounted a sensing transducer 58 and 60. As will be further described hereinafter, the diaphragms are responsive to pressure variations within the chambers 34 and 36 to flex, which results in the transducers 58 and 60 providing electrical output signals via conductors 62 and 64.

While not depicted in FIG. 1, it will be seen that the fluidic oscillator 20 includes a power jet nozzle which directs a stream of fluid from the inlet toward the outlet. The power jet nozzle of the fluidic oscillator 20 results in a measurable pressure drop between the inlet 22 and the outlet 24 of the oscillator 20. Turning for a moment to the structure of the bypass unit 14, it will be seen that this unit provides a plurality of flow paths each referenced with the numeral 66. Each flow path 66 is in fluid flow parallel with the flow path through the fluidic oscillator 20 between inlet 22 and outlet 24 thereof. Each flow path 66 of the bypass unit 14 is provided with a fluid flow restriction 68 which replicates the coefficient of discharge characteristic of the power jet nozzle within the fluidic oscillator 20. As a result, because the pressure drop across the flow meter 10 between inlet 16 and outlet 18 is the same for the fluidic oscillator 20 as it is for the bypass unit 14, each of the flow paths 66 within the bypass module 14 will flow substantially the same fraction of volume of fluid per unit time as that which flows through the fluidic oscillator 20.

Figure 2:
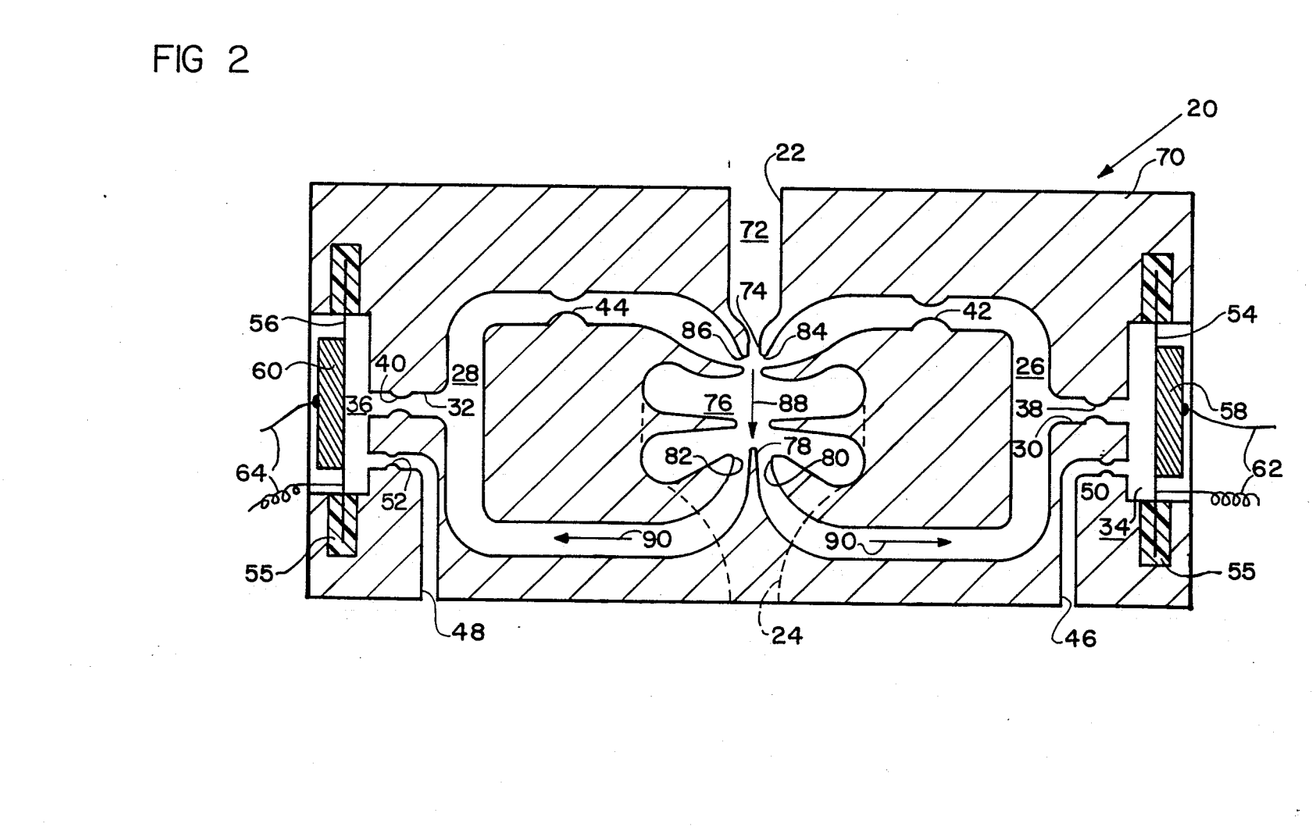
FIG. 2, functionally and schematically depicts a fluidic flow rate sensing device embodying the invention.

Turning to FIG. 2, it will be seen that the fluidic oscillator 20 includes a housing 70 defining the inlet 22, outlet 24 and other structures of the fluidic oscillator. The housing 70 defines a flow path generally referenced with the numeral 72 and extending between the inlet 22 and the outlet 24. The flow path 72 defines a power jet nozzle 74 opening into an interaction chamber generally referenced with the numeral 76. The interaction chamber 76 opens downwardly out of the plane of FIG. 2 to the outlet 24. Housing 70 also defines a knife-edged splitter member 78 which is aligned with the power jet nozzle 74 and is disposed oppositely thereof across interaction chamber 76. The splitter member 78 separates a pair of feedback inlets 80 and 82 which communicate respectively with the feedback channels 26 and 28. Eahc one of the feedback channels 26 and 28 communicates respectively with one of a pair of feedback outlets 84,86 which are oppositely disposed perpendicularly to the power jet nozzle 74, and between the latter and the interaction chamber 76.

In order to reduce the effect of electrical interference upon the output signal produced by the transducers 58,60, an electrical insulation 55 is provided between the diaphragms 54,56 and the housing 70. As a result, both the diaphragms 54,56 and transducers 58,60 are electrically isolated from the housing 70. As will be further seen hereinafter, the housing 70 may act to additionally shield the transducers 58,60, and diaphragms 54,56 from electrical interference.

Having observed the basic structure of the fluidic oscillator 20, it is well to now consider its method of operation. It will easily be understood that when fluid flows into the inlet 16 of the fluid flow meter a portion of this fluid must flow through the fluidic oscillator 20 via inlet 22, the flow path 76 leading to outlet 24, and vent passages 46,48. Fluid entering the inlet 22 upon flowing through the power jet nozzle 74 forms a stream of fluid referenced with the numeral 88 which projects across the interaction chamber 76 toward the splitter member 78. Upon encountering the splitter member 78, the fluid stream 88 divides so that a portion thereof is received by each of the feedback inlet 80 and 82. Inherently, a slightly greater portion of the fluid stream 88 will be received by one of the feedback inlets 80 and 82 than is received by the other of these feedback inlets. The velocity of the fluid stream 88 is partially reconverted to pressure at the feedback inlets 80 and 82 in prportion to the degree of split of the fluid stream 88. Fluid received by the feedback inlets 80 and 82 is communicated by the respective feedback channels 26 and 28 to the respective feedback outlets 84 and 86. Because one of the feedback inlets will have received a slightly greater portion of the fluid stream 88, fluid issuing from the associated feedback outlet will exert a greater lateral pressure force upon the fluid stream issuing from power jet nozzle 74 than does the fluid from the other feedback outlet. As a result of the differential pressure effective at outlet 84,86, the fluid stream 88 will be urged toward the feedback inlet having received the lesser portion of the stream 88. This phenomenon results in oscillation of the fluid stream 88 between the two feedback inlets 80 and 82 on opposite sides of the splitter member 78. The period of oscillation is a function of the velocity of the fluid stream 88 and the effective transport and feedback distance of the oscillator 20. This transport distance in substance is the linear dimension from the area where the power jet nozzle 74 opens to the interaction region 76 adjacent the feedback outlets 84 and 86, across the interaction chamber 76 to the feedback inlets 80,82. The feedback distance is the dimension around the feedback channels 26 and 28 to the feedback outlets 84 and 86.

It will be understood that not all of the fluid stream 88 is received into the feedback inlets 80 and 82 and that the majority of the fluid is allowed to flow from the fluidic oscillator 20 via the outlet 24. Considering the fluid within the feedback channels 26 and 28, it will be seen that when the fluid stream 88 is received into either one of the feedback inlets 80 or 82, the associated channel receives a portion of fluid the kinetic energy of which is partially converted to a pressure which migrates through the fluid within the feedback channel at the acoustic velocity of the particular fluid. The pressure in the feedback channels communicates via the branch passages 30 and 32 into the variable-volume sensing chambers 34 and 36. As a result, the diaphragms 54 and 56 flex in response to the pressure variations experienced within the sensing chambers 34 and 36. Flexing to the diaphragms 54 and 56 results both in variation of the volume defined within chambers 34,36, and in flexing to the transducers 58 and 60. Flexing transducers 58,60 result in an electrical signal conducted by conductors 62 and 64. It will be seen that as the diaphragms 54 and 56 flex, the volumes of the chambers 34 and 36 increase and decrease so that the chambers 34 and 36 exhibit fluidically a capacitance. The channels 26,28 may be considered to exhibit a fluidic inductance which arises from the liquid density and the dimensions of these channels.

In order to prevent the capacitance of the sensing chambers 34 and 36 from dynamically interacting with the inductance of the feedback channels 26 and 28 to produce noise or ringing, the Applicants provide fluid flow restrictions 38 and 40 in the branch passages 30 and 32. However, the restrictions 38 and 40 would have the effect, the Applicants believe, of reducing the magnitude of the pressure variations experienced in the chambers 34 and 36 and available for sensing by flexing of the diaphragms 54 and 56. In order to offset this reduction in the pressure variations experienced in the sensing chambers 34 and 36, the Applicants provide fluid flow restrictions 42 and 44 which are disposed downstream of the respective branch passages at each of the feedback channels 26 and 28. Further, in order to insure that all air or compressible gas is purged from the sensing chambers 34 and 36 and therefore does not interfere with flexing of the diaphragms 54 and 56 by fluid pressure variations experienced therein, the Applicants provide the vent passages 46 and 48 having fluid flow restrictions 50 and 52 therein. These vent passages allow a relatively small but significant flow of fluid from the feedback passages 26 and 28 through the respective sensing chambers 34 and 36 so that all compressible gasses are purged therefrom.

Figure 3:
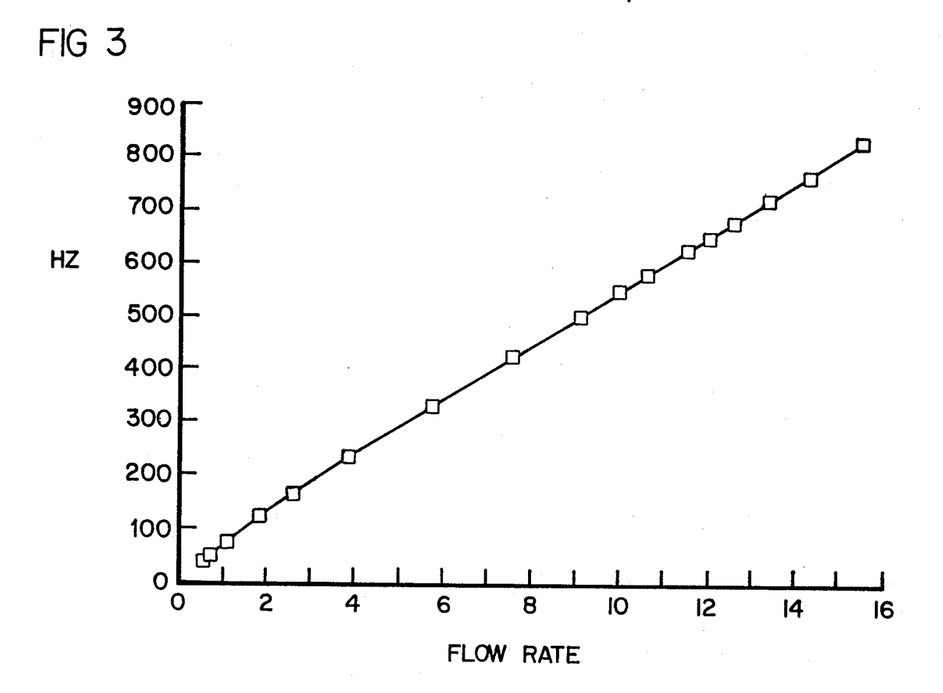
FIG. 3 graphically present data of output signal level versus fluid volumetric flow rate obtained by testing an actual reduction to practice of the present invention.
Figure 4:
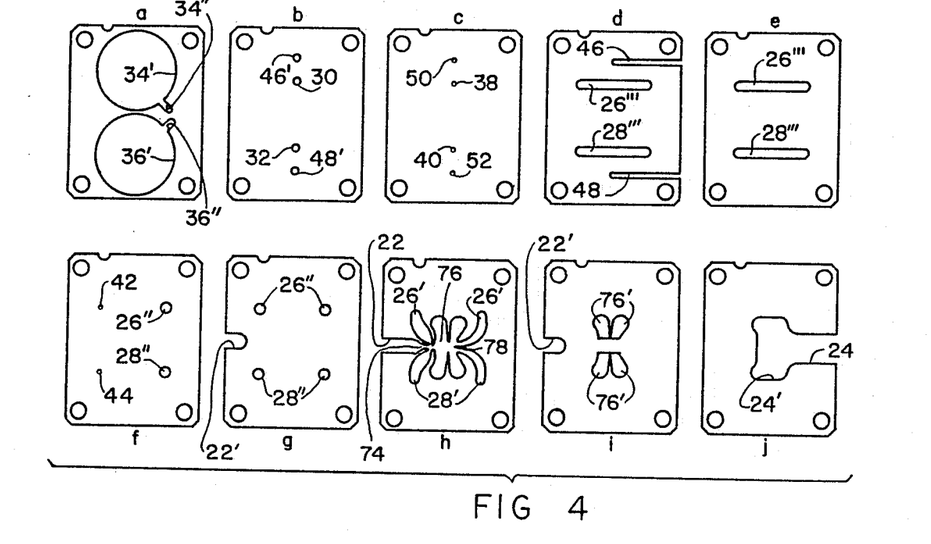
FIG. 4 depicts a sequentially arranged group of laminae which when stacked and interbonded in the alphabetic order presented cooperatively define a fluid flow rate sensing device according to one embodiment of the invention.

Turning to FIG. 3, it will be seen that an oscillator according to an actual reduction to practice of the present invention displayed a high degree of linearity of oscillation frequency verses liquid flow rate passing therethrough. FIG. 3 shows the plotting points resulting from testing of the oscillator at various known liquid flow rates fall, in effect, perfectly on a straight line. The actual reduction to practice of the inventive oscillator was effected by the use of stacked fluidic laminae as are depicted by FIG. 4. These laminae are alphabetically designated "a" through "j" on FIG. 4 in stacking order. In order to promote continuity of description, features of the laminae which are anlogous in structure or function of those which were depicted schematically in FIGS. 1 and 2 are referenced with the same numeral, perhaps with one or more primes added to distinguish portions of structure.

Viewing FIG. 4 in greater detail it will be seen that lamina "h" defines an inlet 22 in conjunction with laminae "g" and "i" having notches 22' aligning with the inlet passage 22 in lamina "h" to define a convergent inlet opening. Lamina "h" likewise defines a pair of feedback passage portions 26' and 28'. These feedback passage portions communicate with openings 26",28" defined in laminae "g" and "f", as well as with restrictive orifices 42 and 44, the latter of which are defined only in lamina "f". Viewing laminae "e" and "d", it will be seen that the feedback channels are completed by a pair of aligning elongate openings 26''' and 28''' communicating the openings 26" and 28" of lamina "f" with the restrictive orifices 42 and 44 thereof. Lamina "c" defines a pair of restrictive orifices 38 and 40 respectively communicating with the elongate openings 26''' and 28''' of laminae "d" and "e". The restrictive orifices 38 and 40 of lamina "c" align with holes 30 and 32 defined by lamina "b" to define the branch passages opening to the sensing chambers 34 and 36, recalling the description of FIGS. 1 and 2.

Viewing FIG. 4 once again, it will be seen that lamina "a" defines a pair of large openings 34',36' communicating with the holes 30 and 32 of lamina "b", and the function of which will be further described hereinafter. Lamina "a" also defines a pair of elongate notches 34",36" extending radially outwardly from openings 34',36', respectively. Lamina "b" defines a pair of holes 46',48' communicating also with the openings 34',36' of lamina "a" and further communicating with restrictive openings 50 and 52 of lamina "c". The vent passages are substantially defined by lamina "d" which provides a pair of elongate slots 46 and 48 communicating with the restrictive openings 50 and 52 and extending to the edge of the laminae. In order to complete the description of the laminae stack shown in FIG. 4, it must be noted that lamina "i" defines four rather winged-shaped openings 76' in alignment with the interaction chamber 76 defined by lamina "h". The openings 76 of lamina "i" align with a collection chamber 24' portion of outlet 54 defined by lamina "j" and communicating with an outlet slot 24 extending to the edge thereof. It will be understood that while lamina "a" is the top lamina of a fluidic laminae stack embodying the features of the present invention, the stack would ordinarily be bounded at its opposite side by a plain lamina having no fluidic openings therein and bounding the outlet chamber 24' and outlet 24 below lamina "j" and the plane of FIG. 4.

Figure 5:
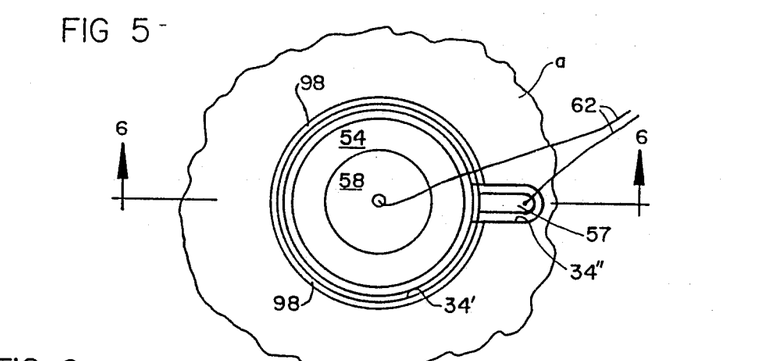
FIGS. 5 and 6, respectively, present a fragmentary plan view and a fragmentary partially cross-sectional view of a portion of the fluid flow rate sensing device of one embodiment of the invention.
Figure 6:
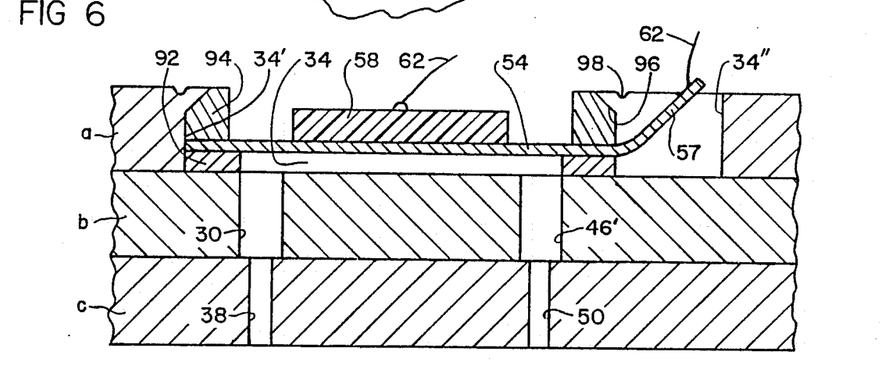

FIGS. 5 and 6 in conjunction depict a frament of the structure of the laminae stack shown in FIG. 4. Viewing FIG. 5 in particular it will be seen that the laminae "a", "b" and "c" in conjunction substantially define the sensing chamber 34, the branch and vent passages 30 and 46' respectively, and the flow restrictive orifices 38 and 50. The structure defining sensing chamber 36 is substantially similar, and so will not be further described. Recalling the description of FIG. 4, it will be seen that the restrictive opening 38 communicates with the opening 26''' in lamina "d" while the flow restrictive orifice 50 communicates with vent passage slot 46 in lamina "d". Received within the opening 34' of lamina "a" is an annular spacing and sealing member 92. The member 92 sealingly engages the surface of lamina "b". The flexible diaphragm 54 is received into opening 34' of lamina "a" and sealingly engages the sealing and spacing member 92. Because of the sealing and spacing member 92, the diaphragm 54 is spaced slightly away from the lamina "b" to cooperatively define the sensing chamber 34. An annular capture member 94 is also received in opening 34' in engagement with the outer surface of diaphragm 54. The capture member 94 defines a chamber 96 on the outer diameter thereof.

Viewing FIGS. 5 and 6 in conjunction, it will be seen that the material of lamina "a" is swaged radially inwardly at 98 toward the center of opening 34' and against the shoulder 96 presented by ring 94 to capture the ring, the diaphragm 54 and the spacing member 92 within the opening 34A. FIG. 6 depicts that the swaging of lamina "a" is performed as a substantially circumferentially continuous groove 98. Because of the swaging 98 of the material of lamina "a" into engagement with shoulder 96 of the capture ring 94, the ring 94 is held into tight engagement with the diaphragm 54, and the latter is likewise held in sealing engagement with the sealing ring 92. The groove resulting from swaging lamina "a" at 98 is interrupted by notch 34", which extends radially outwardly from opening 34' of lamina "a". Diaphragm 54 defines a radially outwardly extending portion 57 extending into the notch 34" outwardly of ring 94. The portion 57 is bent upwardly out of the plane of diaphragm 54 to displace the outer end thereof toward the outer surface of lamina "a". One wire 62 is connected to the portion 57 adjacent the outer end thereof.

Mounted upon the diaphragm 54 by use of an electrically conductive adhesive is a piezoceramic disc 58 which has previously been identified in the schematic representations of the invention as a transducer member. The piezoceramic disc conventionally responds to flexure of the diaphragm 54 by producing an electrical output conducted to a point of utilization via the other conductor 62. In order to electrically isolate the diaphragm 54, and piezoceramic disc 58 mounted thereon, from the housing cooperatively defined by laminae "a –j", the radially outer peripheral portion of the diaphragm is provided with a relatively thin coating of dielectric polymer. This polymer coating may be tetrafluoroethylene, for example. While this insulative coating on diaphragm 54 is too thin to be effectively depicted in FIGS. 5 and 6, it is depicted schematically as insulation 55 on FIG. 2. The insulative coating 55 on diaphragm 54 is of sufficient thickness to effectively isolate the latter from electrical contact with lamina "a" or "b" via the spacing ring 92, as well as from lamina "a" via capture ring 94, viewing FIG. 6.

Figure 7:
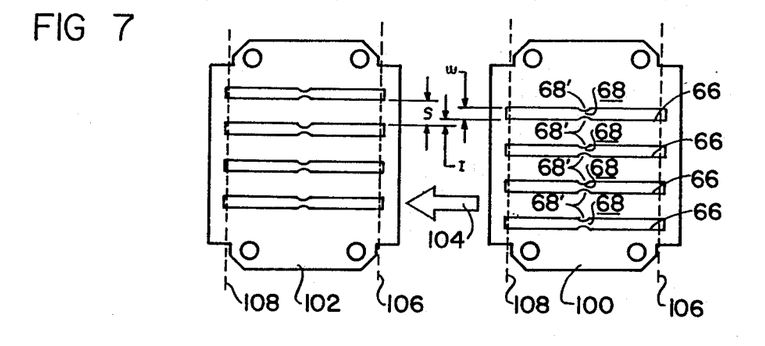
FIG. 7 depicts two laminae at an intermediate stage of manufacture which when stacked and interbonded with other like lamina substantially defines a fluid bypass component of a fluid flow meter according to the invention.

Turning once again to FIG. 1, it will be recalled that the bypass unit 14 defines a plurality of bypass passages 66, each provided with its own restriction 68 replicating the coefficient of discharge characteristic of the power jet within the fluidic oscillator 20. FIG. 7 depicts a pair of laminae 100,102 at an intermediate stage of manufacture for the bypass unit 14. It will be noted that each of the laminae 100,102 similarly to the laminae "a" through "j" depicted in FIG. 4 conventionally includes four unreferenced alignment holes which are used during the manufacture of a laminae stack, as will be readily understood by those skilled in the fluidic art. Viewing the laminae 100 and 102, it will be immediately noted that these laminae are substantially identical with one being reversed top to bottom with respect to the other. Each laminae includes a plurality of elongate openings 66 extending from near one edge to near the other edge. Intermediate of the ends of the opening 66 the laminae define a pair of confronting protrusions 68' which cooperate to define a fluid flow restriction 68. Each of the elongate openings 66 defines a width dimension which is referenced on lamina 100 with the character W. Also, the elongate opening 66 is spaced apart by a dimension referenced on lamina 102 with the character S. The dimension S exceeds the width W of the elongate openings 66 according to twice an interbonding dimension referenced between the laminae 100 and 102 with the reference character I.

It will be seen that when the laminae 100 and 102 are stacked one upon the other as depicted by arrow 104, an interbonding region is provided on each side of each elongate opening 66, which in width is equal to dimension I. Therefore, a plurality of laminae 100,102, each being substantially identical, may be stacked, with each one being reversed respective to its immediately adjacent neighbors, and interbonded. The interbonded stack of laminae 100,102 is then trimmed at each side along a cutting line 106,108 to open the ends of the elongate openings 66. Those skilled in the fluidic art will recognize that a laminae stack for making a bypass unit 14 will also include at each end thereof for bounding the outermost bypass passages a plain laminae having no openings other than the unreferenced alignment holes.

Figures 8, 9:
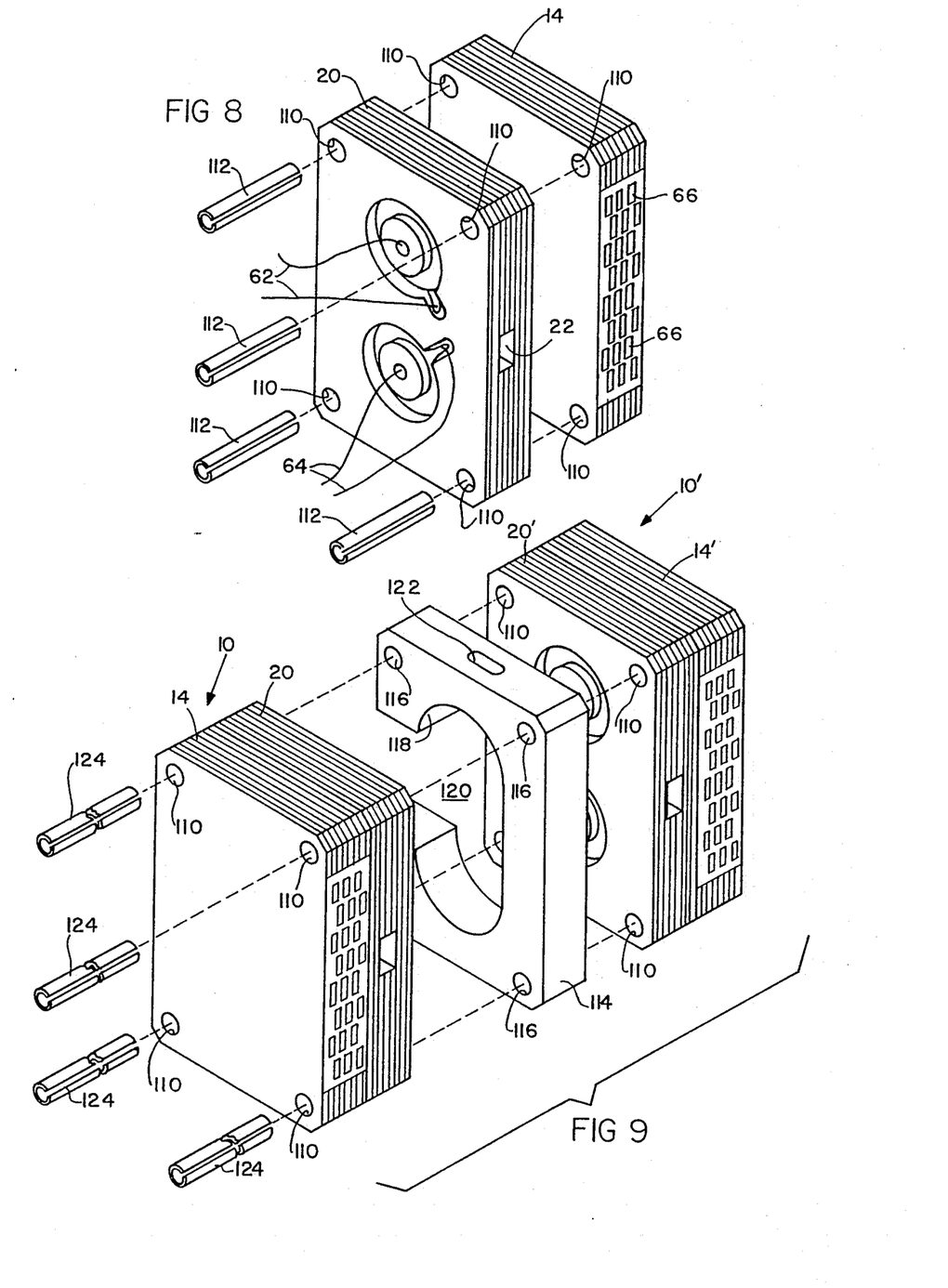
FIG. 8 is an exploded perspective view of a fluid flow rate module embodying the invention and including a fluidic flow rate sensing device and a bypass member.
FIG. 9 is an exploded perspective view similar to FIG. 8 and depicting an alternative embodiment of the invention which provides a redundant output fluid flow rate sensing module.

Viewing FIG. 8, it will be seen that the resulting bypass unit 14 is essentially a prismatic solid having openings 66 extending theregthrough from one face of the prism to the opposite face. Because of the way in which the laminae 100,102 were reversed or alternated in the stacking of bypass unit 14, the plurality of bypass passages 66 are arranged within the bypass unit in a regular grid-like pattern. Also, viewing FIG. 8 it will be noted that the previously unreferenced alignment holes which were conventionally used during manufacturing for stacking of the laminae preparatory to the interbonding process may advantageously be used for intersecuring a bypass unit 14 to a fluid flow rate sensing module 20. Each of the alignment holes which are referenced on FIG. 8 with the numeral 110 may, when a bypass unit 14 is stacked with an oscillator module 20, align with one another and removably receive a rolled spring steel pin 112. The spring steel pin 112 is removably force-fitted into the aligned holes 110 of the bypass module 14 and oscillator module 20 to hold these two modules securely together while allowing optional disassembly thereof.

FIG. 9 depicts a portion of a redundant fluid flow meter according to the invention. The redundant fluid flow meter of FIG. 9 includes a first meter 10 having a bypass unit 14 and fluidic oscillator device 20, and a second fluid flow meter 10' having an associated bypass unit 14' and fluidic oscillator device 20'. The first and second fluid flow meters 10 and 10' are substantially identical and are arranged with their inlets and outlets like disposed. Interposed between the two fluid flow meters 10 and 10' is a spacing member 114 defining four through holes 116 which have the same spacing therebetween as the alignment holes 110 in the bypass units 14,14' and fluidic oscillator devices 20,20'. The spacing member 114 also defines a C-shaped through passage 118 opening outwardly in a downstream direction. The through passage 118 when the fluid flow meters 10 and 10' are assembled with the spacing member 114 provides liquid communication to the outer face of the flexible diaphragms 54 and 56 of each of the fluid flow meters 10 and 10'. The through passage 118 within spacing member 114 also provides a chamber 120 within which the conductor 62,64 from the piezoceramic discs and diaphragms on each of the oscillator devices 20 and 20' are received. The conductors 62 and 64 may advantageously be led outwardly from the piezoceramic discs 58,60 and chamber 120 through an opening 122 extending from the latter to open outwardly on the spacing member 114. Viewing FIG.9 and considering the arrangement of the modules 10 and 10' when sandwiching the spacing member 114 therebetween, it will be seen that the alignment holes 110 of each of the fluid flow meters aligns with one another and with the through holes 116 of the spacing member 114. Consequently, relatively long spring steel roll pins 124 may be forcibly inserted into the aligned holes 110 of the fluid flow meters 10 and 10' and into the through holes 116 of spacing member 114 to secure these elements together.

Figure 10:
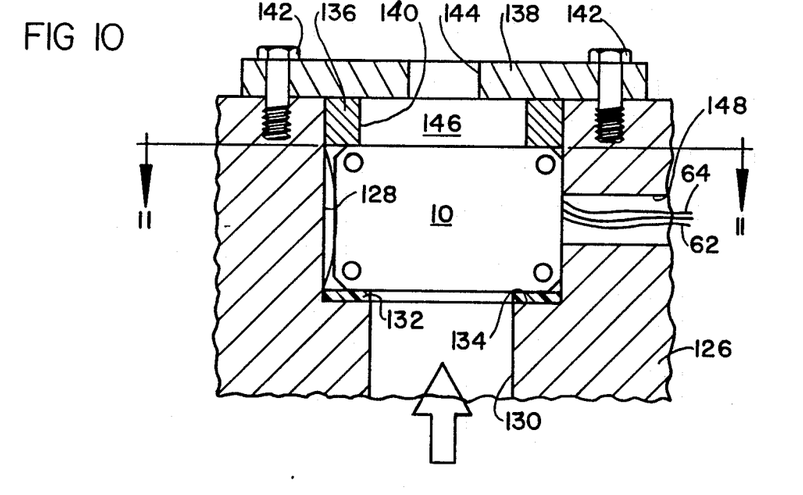
FIGS. 10 and 11, respectively, depict fragmentary cross-sectional views of a fluid flow meter employing a redundant module like that depicted in FIG. 9 and a housing providing for fluid flow to and from the flow rate sensing module.
Figure 11:
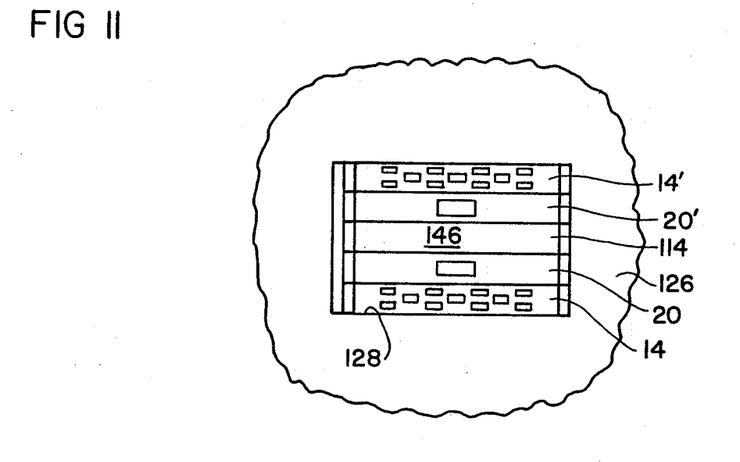

FIGS. 10 and 11 illustrate that a fluidic flow meter like that illustrated in FIG. 9 may be advantageously housed within a housing 126 providing a rectangular recess 128 therein for receiving the fluidic flow meters 10 and 10' along with the spacing member 114. The housing 126 provides an inflow passage 130 extending to the recess 128 and flow meter 10,10' therein. Within the recess 128, the flow meter 10,10' is sealingly received upon a resilient gasket 132 disposed upon a shoulder 134 defined by the cooperation of recess 128 and inflow passage 130. In order to urge the flow meter 10,10' into sealing engagement with the gasket 132, a spacing member 136 and outlet coverplate 138 are provided. The spacing member 136 is rectangular in plan view to slidably be received within the recess 128 above the flow sensor 10. Spacing member 136 defines a through passage 140 leading from the outlets of the flow sensor 10,10' and of the bypass units 14 thereof. The outlet coverplate 138 is removably secured to the housing 126, as by fasteners 142 passing therethrough and threadably engaging the housing 126. The outlet coverplate 138 defines an outlet port 144 opening from a chamber 146 defined by the cooperation of the spacer member 136, the through passage 140 thereof, the fluid flow sensor 10,10' and the outlet coverplate 138. The housing 126 also defines a passage 148 aligning with the passage 122 (viewing FIG. 9) of the spaced member 114 of fluid flow sensor 10,10' and providing for passage of the conductors 62,64 outwardly of the housing 126.

Recalling the description of FIGS. 2, 5 and 6, particularly with reference to the electrically insulative coating 55 upon the diaphragms 54,56 and the purpose thereof, it will be noted that as installed in the cavity 128, the fluid flow meters 10,10', are electrically in contact with the housing 126. On the other hand, the diaphragms 54,56, and piezoceramic discs 58,60 thereon are electrically isolated from and surrounded by the housing 126 and the remainder of the fluid flow meter. Additionally, viewing FIG. 9 it will be seen that the remainder of the fluid flow meters 10,10' along with the spacer member 114 virtually completely surround the diaphragms 54,56 and piezoceramic discs 58,60. Consequently, the Applicants believe the remainder of the fluid flow meters 10,10' may electrically shield the electrical output portions of the invention from electrical interference.

Figure 12:
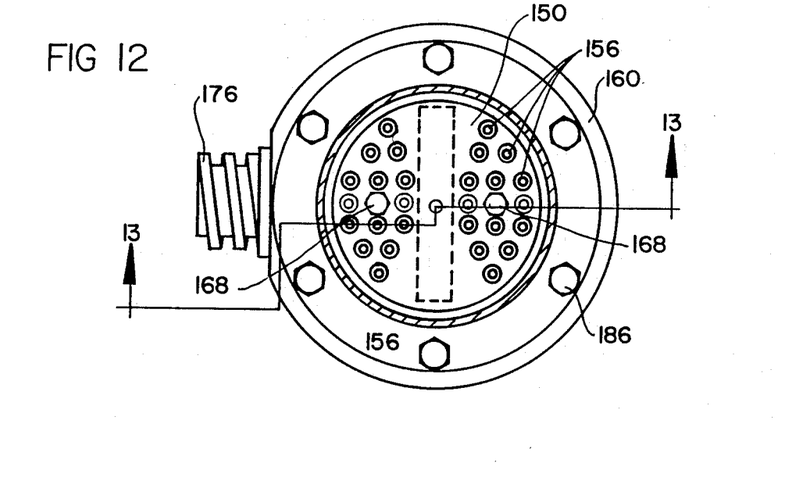
FIG. 12 depicts a partially cross-sectional view of an alternative embodiment of a fluid flow meter embodying the invention.
Figure 13:
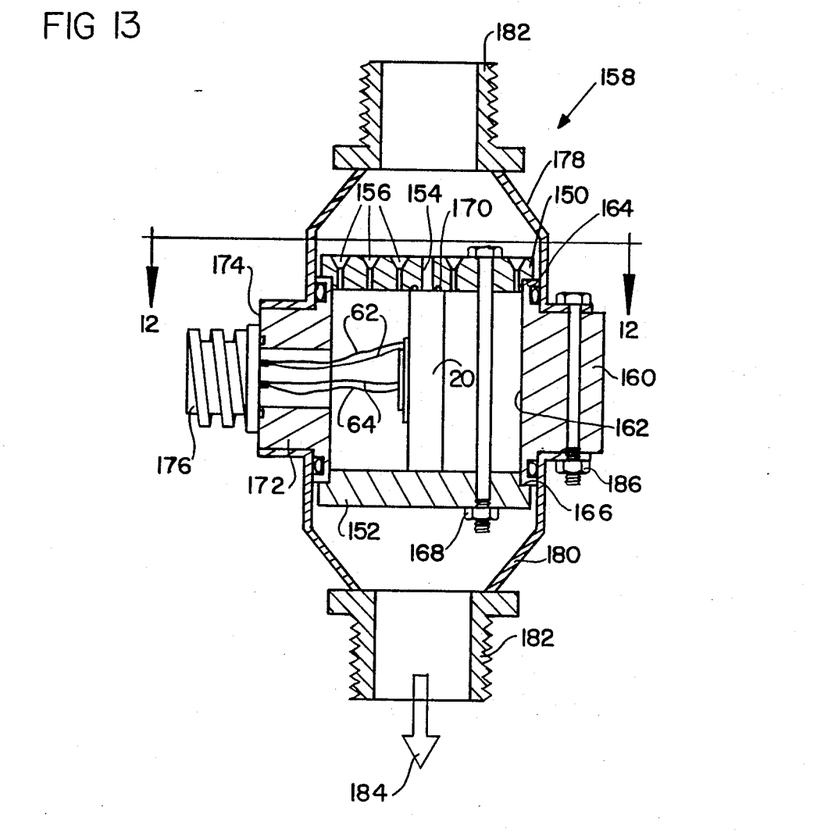
FIG. 13 is a cross-sectional view taken along line 13—13 of FIG. 12.

FIGS. 12 and 13 depict an alternative embodiment of the invention wherein the fluidic oscillator module 20 is received between a bypass plate 150 and a bar-like retaining member 152. The bypass plate 150 provides a central inlet passage 154 leading to the inlet of the fluidic oscillator module 20. Also, the bypass plate provides a plurality of bypass passages extending therethrough, and each replicating the coefficient of discharge of the power jet nozzle within the fluidic oscillator module 20. The bypass plate 150, oscillator module 20, and retainer 152 are received within a three-part housing generally referenced with the numeral 158. The housing 158 includes a central portion 160 defining a through bore 162. Each of the bypass plate 150 and retainer member 152 define a reduced diameter portion cooperating with the remainder of each to define respective shoulders 164,166. The reduced diameter portion of each of the bypass member 150 and retainer member 152 are received into the through bore 162 of the central portion 160 so that the shoulder 164 sealingly engages the central portion 160. A pair of fasteners 168 extend between the bypass plate 150 and retainer 152 to urge the latter into engagement with the central portion 160 of housing 158.

The spacing between the bypass plate 150 and retainer member 152 is selected to captively receive the fluidic oscillator module 20 therebetween. A sealing member 170 is provided between the bypass plate 150 and the fluidic oscillator module 20. The central portion 160 of housing 158 defines a radially extending boss 172 which defines a mounting surface 174 upon which is sealingly secured an electrical connector 176. The connector 176 provides for conduction outwardly of the housing 158 of the electrical signals originating with the piezoceramic transducers of the fluidic oscillator module 20.

The housing 158 also includes a pair of end portions 178 and 180 which are substantially identical. The end portions 178 and 180 each define a threaded part 182 which is configured to sealingly mate with a standard tube fitting (not shown). The end portions 178,180 provide an inlet for fluid flow to the fluidic oscillator member 20 and bypass plate 150, and flow therefrom, as is indicated by the arrow 184. Each of the end portions 178 and 180 are sealingly secured to the center portion 160 of the housing 158 as by a plurality of fasteners 186 passing therethrough via aligned holes in each. The embodiment of the invention depicted by FIGS. 12 and 13 has been found by the Applicants to be particularly useful for in-line applications in which it is desirable to determine the volumetric fluid flow rate through a pipeline or conduit, for example.

While the present invention has been depicted and described with reference to several preferred embodiments thereof, no limitation upon the invention is implied by such reference, and no such limitation is to be inferred. The invention is intended to be limited only by the spirit and scope of the appended claims, which also provide an additional definition of the invention.

We claim:

1. Fluidic lamina for stacking an interbonding with plural substantially identical lamina to define a fluidic bypass member of exteriorly prismatic shape, and having a plurality of bypass passages provided by each lamina in cooperation with next adjacent lamina, each bypass passage substantially replicating a selected discharge coefficient, said lamina comprising:
    a first and a dissimilar second spaced apart end portions, each end portion defining substantially identical cooperable alignment features for stacking of said lamina in aligned relation with substantially identical lamina, each in sequentially opposite end orientation;
    a pair of spaced apart removable waste side edge portions connecting said end portions;
    said lamina defining a plurality of equally spaced apart similar bypass passage openings of certain width and extending from within one of said pair of removable side edge portions to within the other of said removable side edge portions, said bypass passage openings separating a plurality of similar equally spaced apart boundary portions connecting said removable side edge portions and each of determined width exceeding said certain width by twice an interbonding dimension;
    said plurality of bypass passage openings being offset as a group from a centered position on said lamina toward one of said pair of end portions and away from the other of said end portions by a dimension equal to one-half the total of said certain width plus said interbonding dimension to result in said end portions being dissimilar in width;
    whereby stacking of plural lamina each in sequentially opposite end orientation results in bypass passage openings of each lamina being bounded by boundary portions of next adjacent stacked lamina, and the wider of said end portions of a lamina bounding the bypass passage opening next adjacent to the narrower of said end portions of adjacent lamina, and said removable waste side edge portions are removed after interbonding of said stacked lamina to open inlet and outlet ends of said bypass passages.

2. The invention of claim 1 further including each end portion and each boundary portion defining an aligned protrusion extending into the adjacent ones of said bypass passage openings to cooperatively replicate a fluidic power jet nozzle in each of said plurality of bypass passages.

* * * * *